(12) United States Patent
Bevington et al.

(10) Patent No.: US 8,306,852 B2
(45) Date of Patent: Nov. 6, 2012

(54) SYSTEM AND METHOD OF MANAGING CHANGE PROCESS

(75) Inventors: Thomas W. Bevington, Toorak (AU); Frances Bevington, Toorak (AU)

(73) Assignee: Bevington & Partners Pty Ltd, Carlton (AU)

(*) Notice: Subject to any disclaimer, the term of this patent is extended or adjusted under 35 U.S.C. 154(b) by 1555 days.

(21) Appl. No.: 10/491,348

(22) PCT Filed: Oct. 2, 2002

(86) PCT No.: PCT/AU02/01341
§ 371 (c)(1),
(2), (4) Date: Aug. 18, 2004

(87) PCT Pub. No.: WO03/030038
PCT Pub. Date: Apr. 10, 2003

(65) Prior Publication Data
US 2004/0267588 A1   Dec. 30, 2004

(30) Foreign Application Priority Data
Oct. 2, 2001   (AU) .............................................. 8046

(51) Int. Cl.
*G06Q 10/00* (2012.01)
(52) U.S. Cl. ...................................................... 705/7.37
(58) Field of Classification Search .................. 705/7.37
See application file for complete search history.

(56) References Cited

U.S. PATENT DOCUMENTS

| | | | |
|---|---|---|---|
| 5,675,745 A | 10/1997 | Oku et al. | |
| 5,768,586 A * | 6/1998 | Zweben et al. | 713/100 |
| 5,787,280 A * | 7/1998 | Joseph et al. | 1/1 |
| 5,799,286 A * | 8/1998 | Morgan et al. | 705/30 |
| 6,192,368 B1 * | 2/2001 | Gerard et al. | 1/1 |
| 6,295,478 B1 * | 9/2001 | Inada | 700/51 |
| 6,636,585 B2 * | 10/2003 | Salzberg et al. | 379/22 |
| 6,996,601 B1 * | 2/2006 | Smith | 709/203 |
| 7,159,237 B2 * | 1/2007 | Schneier et al. | 726/3 |
| 7,606,726 B2 * | 10/2009 | Nelson | 705/10 |
| 7,624,036 B2 * | 11/2009 | Arora | 705/10 |

(Continued)

FOREIGN PATENT DOCUMENTS
WO   WO 00/72211 A2   11/2000

OTHER PUBLICATIONS

Develin, Nick. Overhead Productivity: The Organisational Impact of IT. Work Study, vol. 40, No. 3, 1991, p. 22-3.*
Youngblood, Mark D. Leadership at the edge of chaos: From control to creativity. Strategy and Leadership v25n5 pp. 8-14 Sep./Oct. 1997.*
Baker, Sunny; Baker, Kim. Project Management. copyright 2000.*

*Primary Examiner* — Johnna Loftis
(74) *Attorney, Agent, or Firm* — Christensen O'Connor Johnson Kindness PLLC

(57) ABSTRACT

A system for managing changes to obviate inefficiencies in business processes involves identifying business activities (36) being performed and categorising (34) the activities. Using the category designations (34) to reveal non-contributory activities, drivers of the causes of inefficiencies are identified. A second set of activities (46) incorporates outcomes of proposed improvements. Linking (38, 40, 42, 44) between existing (36) and improved (46) activity sets ensures necessary activities are incorporated to achieve the desired outcome. Linkages between the activities within the activity set and the business function that performs them also enables accountability and measures to be assigned.

15 Claims, 3 Drawing Sheets

| ACT. NO. | ACTIVITY | CAT | EMPLOYEE 1 | EMPLOYEE 2 | EMPLOYEE 3 | EMPLOYEE 4 | EMPLOYEE 5 | TOTAL | DRIVER |
|---|---|---|---|---|---|---|---|---|---|
| 1.0 | PREPARE LOAN OFFER | | | | | | | | |
| 1.1 | RESEARCH INSURANCE OPTIONS | S | 2.0 | 2.0 | 5.0 | 2.0 | 5.0 | 16.0 | |
| 1.2 | CHASE UP MISSING DETAILS | N | 0.5 | 0.5 | 1.0 | 2.0 | 1.5 | 5.5 | FORM DESIGN |
| 1.3 | MAKE RECOMMENDATION FOR LOAN | C | 1.0 | 2.0 | 1.0 | 4.0 | 0.5 | 8.5 | |
| 1.4 | REFER TO MANAGER FOR REVIEW | D | 1.0 | 2.0 | 1.0 | 3.0 | 1.0 | 8.0 | |
| 1.5 | MAKE ANY CHANGES REQUIRED | N | 1.0 | 2.0 | 1.0 | 3.0 | 1.0 | 8.0 | LACK OF TRAINING |
| 1.6 | PREPARE FAX FOR AREA LENDING MANAGER APPROVAL | D | 0.3 | 0.4 | 0.3 | 0.5 | 0.5 | 8.0 | |
| 1.7 | MAKE ANY CHANGES REQUIRED | N | 0.5 | 1.0 | 0.25 | 1.0 | 0.5 | 3.25 | LACK OF TRAINING |
| 1.8 | CONTACT CUSTOMER WITH OUTCOME OF APPLICATION | C | 1.0 | 2.0 | 1.0 | 4.0 | 0.5 | 8.5 | |
| 1.9 | IF CUSTOMER NOT HAPPY REFER BACK TO MANAGER | N | 0.5 | 1.0 | 0.5 | 1.0 | 1.0 | 4.0 | LACK OF TRAINING/ COMMUNICATION UP FRONT |
| 1.10 | INPUT INTO COMPUTER | N | 1.0 | 1.0 | 2.0 | 4.0 | 1.0 | 9.0 | LACK OF AUTOMATION |
| | TOTAL | | 8.8 | 13.9 | 13.05 | 24.5 | 12.5 | 72.75 | |

U.S. PATENT DOCUMENTS

| | | |
|---|---|---|
| 2001/0008997 A1 | 7/2001 | Masuda et al. |
| 2002/0026630 A1* | 2/2002 | Schmidt et al. ............... 717/103 |
| 2002/0143595 A1* | 10/2002 | Frank et al. ....................... 705/8 |
| 2003/0086536 A1* | 5/2003 | Salzberg et al. ........... 379/15.02 |

* cited by examiner

| ACT. NO. | ACTIVITY | CAT | EMPLOYEE 1 | EMPLOYEE 2 | EMPLOYEE 3 | EMPLOYEE 4 | EMPLOYEE 5 | TOTAL | DRIVER |
|---|---|---|---|---|---|---|---|---|---|
| 1.0 | PREPARE LOAN OFFER | | | | | | | | |
| 1.1 | RESEARCH INSURANCE OPTIONS | S | 2.0 | 2.0 | 5.0 | 2.0 | 5.0 | 16.0 | |
| 1.2 | CHASE UP MISSING DETAILS | N | 0.5 | 0.5 | 1.0 | 2.0 | 1.5 | 5.5 | FORM DESIGN |
| 1.3 | MAKE RECOMMENDATION FOR LOAN | C | 1.0 | 2.0 | 1.0 | 4.0 | 0.5 | 8.5 | |
| 1.4 | REFER TO MANAGER FOR REVIEW | D | 1.0 | 2.0 | 1.0 | 3.0 | 1.0 | 8.0 | LACK OF TRAINING |
| 1.5 | MAKE ANY CHANGES REQUIRED | N | 1.0 | 2.0 | 1.0 | 3.0 | 1.0 | 8.0 | |
| 1.6 | PREPARE FAX FOR AREA LENDING MANAGER APPROVAL | D | 0.3 | 0.4 | 0.3 | 0.5 | 0.5 | 8.0 | |
| 1.7 | MAKE ANY CHANGES REQUIRED | N | 0.5 | 1.0 | 0.25 | 1.0 | 0.5 | 3.25 | LACK OF TRAINING |
| 1.8 | CONTACT CUSTOMER WITH OUTCOME OF APPLICATION | C | 1.0 | 2.0 | 1.0 | 4.0 | 0.5 | 8.5 | |
| 1.9 | IF CUSTOMER NOT HAPPY REFER BACK TO MANAGER | N | 0.5 | 1.0 | 0.5 | 1.0 | 1.0 | 4.0 | LACK OF TRAINING/ COMMUNICATION UP FRONT |
| 1.10 | INPUT INTO COMPUTER | N | 1.0 | 1.0 | 2.0 | 4.0 | 1.0 | 9.0 | LACK OF AUTOMATION |
| | TOTAL | | 8.8 | 13.9 | 13.05 | 24.5 | 12.5 | 72.75 | |

FIG. 2.

SYSTEM AND METHOD OF MANAGING CHANGE PROCESS

FIELD OF THE INVENTION

This invention relates to a system and method of managing a change process and relates more particularly to a system and method of managing changes to business processes.

BACKGROUND OF THE INVENTION

Most organisations have established business processes consisting of a series of tasks or activities intended to achieve a desired outcome. For example, financial institutions will most likely have a set of activities which, when ordered in a particular sequence, achieves the desired outcome of processing a loan request from an applicant resulting in either acceptance or rejection of the request.

Whilst most organisations have established business processes, it is generally recognised that at least some of the processes are non-optimal and have various deficiencies and inefficiencies. In order to address these problems with established business processes, organisations sometimes use a change management process in an attempt to identify and remove deficiencies or inefficiencies within the processes.

In this respect, flow charting methods have been widely used as a means of identifying individual steps in a business process. However, using a flow charting technique is generally considered an informal process and does not usually include any identification of resource usage or accountability for individual process steps in a consistent manner. As a result, this technique is considered to be of limited value.

An approach that is intended to address the failings of flow charting techniques, generally referred to as the Activity Based Costing or "ABC" process, proposes the use of templates in order to record the activities and the resource levels and accountabilities in a consistent format. However, the ABC technique fails to accurately identify and represent business process failure. Accordingly, ABC techniques are also considered to be of limited effectiveness.

Other techniques have been proposed including time and motion study and time recordal techniques. However, it has been found that these techniques either do not readily identify superfluous activities in the business process or do not accurately represent the activities that are actually performed in order to achieve the desired outcome of the business process.

Previous techniques have generally been carried out manually, and utilising forms, questionnaires, charts and the like for developing data which is then manually manipulated. Such techniques are relatively time consuming and involve substantial input from managers and consultants. Further, such techniques are prone to error through the manual work needed and subjective decision-making.

It is therefore desirable to provide a system and method to facilitate recognition of inefficiencies and deficiencies in processes and to develop improved processes.

It is also desirable to provide a system and method of managing a change process.

It is also desirable to provide a system and method for improving business processes using existing process steps as a base.

It is also desirable to provide a system and method of managing a change process by establishing a set of process activities based on an analysis of existing process steps.

It is also desirable to provide a method of sorting desirable activities from non-desirable activities in a business process.

It is also desirable to provide a method of deriving a change process using activity categories to establish optimum sets of activities to achieve desired outcomes.

It is also desirable to assign accountabilities for changes to a cross-functional process to the specific business functions within organisation(s) that will perform them.

It is also desirable to provide a system and method for deriving a change process that harnesses computer power to analyse processes and develop change programs.

SUMMARY OF THE INVENTION

According to one aspect of the present invention, there is provided a system for deriving a change process in actions performed to achieve a desired result comprising:

a first computer recording means into which data is entered and stored, the data identifying activities actually performed to achieve at least one outcome;

category recording means to enter and store a category designation associated with each said activity and selected from a predefined set of activity categories;

computer program means to develop a second set of activities to achieve the at least one outcome based on the first activity set and the recorded categories; and computer identified links between activities of the first set and activities of the second set to audit the second activity set and identify differences between the first and second set of activities.

Preferably, the computer program means derives said second activity set incorporating identified activities having selected categories and possibly also including data representative of an activity of the set or including input data reflecting predetermined activities.

It is also preferred that the computer identified links relate the second activity set to organisational structures accountable for implementing the process change. The organisational structures may exist within a single organisation or across multiple organisations.

In one embodiment, the computer means is programmed to receive inputs representative of activities of the first activity set actually performed to achieve the at least one outcome, and inputs representative of the second set of activities required to be performed to achieve the at least one outcome, to produce the links between activities of the first and second sets of activities, and determine further activity changes based on links revealing non-essential or non-preferred categories of activities.

According to another aspect of the invention there is provided a method of deriving a change process in actions performed to achieve a desired result comprising the steps of:

analysing a first set of activities being activities intended to achieve at least one outcome;

identifying and recording activities actually performed in order to achieve the at least one outcome;

designating a category for each of those activities according to a predefined set of activity categories;

using the category designations to determine those activities that detract from achievement of the desired outcome;

developing a second set of activities to achieve the desired outcome;

forming links between activities in the first set and activities in the second set which facilitates identifying and analysing differences between the activities of the first and second activity sets.

Preferably, the identification of activities performed, and the designation of a category for each of those activities, is actually performed by the person responsible for the execution of those activities. In preferred embodiments, the predefined set of activity categories includes categories such as "Core", "Support", "Discretionary" and "Noise".

In this respect, an activity designated as being a "Core" activity is considered by staff to be essential to the achievement of the desired business outcome. In addition, the "Support" category is used to identify those activities which are considered to be necessary to support the achievement of the core activities. Activities designated as being of the type "Discretionary" are those activities that may or may not be performed to achieve the desired outcome and may actually be seen to detract from achievement of the desired outcome. However, activities designated as being of the type "Noise" are those activities that directly detract from the achievement of the desired outcome. It has been found that "Noise" activities are generally performed in order to overcome a deficiency in the business process. In identifying and defining the activities that are performed in order to achieve a desired outcome, the identification process should break down activities to a level where they can be assigned a single activity category of either Core, Support, Discretionary or Noise. In any event, it is important that substantially all activities actually performed by staff in attempting to achieve the desired outcome are identified irrespective of the category of those activities.

Preferably, each staff member involved in activities intended to achieve the at least one outcome identifies and records activities which that staff member actually performs in order to achieve the at least one outcome.

By performing the step of identifying activities actually performed, the present invention enables the method of analysing a first set of activities to be based on actual activities being carried out, rather than the analysis being based on one or more abstract job descriptions, on a general business plan or on a hypothetical ideal business scenario. Consequently, actual routine process failures in the first set of activities can be identified.

Furthermore, the identification of actual activities and of actual process failures occurring in those activities, enables steps to be taken to link those activities to the second set of activities, and to measure the extent to which the routine process failures are or can be resolved by the second set of activities. That is, the present invention enables changed scenarios, such as the second set of activities, to be established and implemented based on actual accountability being assigned for the new activities to the organisational structures. Following development of the second set of activities, the present invention further enables prompt updating of procedures, job descriptions, training and competencies, and enables measurement frameworks of such elements to be developed.

It will be understood that business processes are characterised as being comprised of a sequence of process steps or activities that may be distributed cross-functionally within an organisation or cross-functionally across multiple organisations. Thus, the change necessary to obviate inefficiencies and deficiencies in business processes will need to be managed within and across organisations as well as within defined areas. The links between the first set and second set of activities, as well as ensuring all necessary activities are incorporated in the second set, facilitates accountability and measurement of change. Thus, the links may be used to assign accountability for activity performance across the whole organisational structure as well as within units of that structure thereby enabling implementation of the derived changes to be actively managed within and across organisation(s).

Having identified and recorded a first set of activities performed by staff in order to achieve a desired outcome, it is likely that the activities may be arranged in a computer database in a manner to define the cross-functional inter-relationships that exist between business functions performing the activities and the execution of the at least one desired outcome. This enables the contribution of each business function to the achievement of the desired outcome to be understood.

Similarly, the second set of activities may also be derived through a computer program or arranged in a computer database defining cross-functional inter-relationships therebetween such that the activities may be performed to achieve the desired outcome.

In each instance, for both the first and second set of activities, the definition of the inter-relationships between the various activities may be considered as forming a "process map" identifying various paths through the activities in order to achieve one or more business outcomes.

According to the present invention, links are formed between activities of the first and second sets in order to associate activities between the two sets thus assisting identification of the process change that has occurred between the first and second sets of activities. In a preferred embodiment, the activities forming the first and second sets each have associated parameters recorded such as cost, time and resources required to perform the individual activity. Each individual activity may also have information recorded indicating the person or department responsible for the performance of that activity. In this respect, links between activities of the first and second sets may be used to identify differences between the activity sets in achieving the same desired business outcome, and they may also be used to connect the activities within the activity set with the business function that performs them whereby to assign accountability and management of the process change. For example, the links between the activities enables the identification of differences in cost, time or resources required for the performance of various activities in either of the activity sets. The links may also be used to identify changes in responsibility for various activities when considering a change from performing the activities of the first set to performing the activities of the second set. The links may enable implementation of the derived changes to be actively managed within and across organisation(s) as appropriate. This serves to connect the change in process with the accountable business function or individual required to make the change.

In a particularly preferred embodiment, the differences between the first and second sets of activities, identified by the links therebetween, are used to update operating procedures describing how to achieve the at least one desired outcome. Having generated a new operating procedure for an activity in the second set of activities, there may be new competencies or training required in migrating the activity of the first set to the activity of the second set. The links between the activities of the first and second sets may be used to identify these types of differences.

Of course, the links from the first set of activities to the second set of activities enables management to ensure that all the necessary activities are present in the new, or second set of activities to achieve the desired business outcome. In this respect, the change plan formulated in proposing the second set of activities is effectively encapsulated by the links and as such, the links may be used to audit the implementation of the new business process for achieving the desired outcome. At the same time, linkages between the activities within the second activity set and the business function that performs those activities enables accountability to be established for implementation of derived changes.

In a preferred embodiment, the method includes the step of generating job descriptions for each of the activities forming the second set of activities based upon the links to each activity in the first set of activities.

Of course, businesses generally seek to continually improve their business processes and as such the second set of activities may be further improved or refined. In this instance, the second set of activities may be relabelled and considered as a first set of activities and the method may be re-implemented to achieve a further improvement of the business process as performed by the second set of activities. In this respect, it is likely that any proposal to adopt a new set of activities in order to improve the business processes of an organisation would require approval of senior management and a schedule adopted for the implementation of the new set of activities. This schedule may include a planned re-implementation of the method at some time in the future when staff and/or management are expected to be able to accurately designate an activity category for each of the activities in the new set of activities with one of the abovementioned activity categories.

According to a further aspect of the invention, there is provided a computer system for deriving a change process in actions performed to achieve a desired result comprising:

a first computer recording means into which data is entered and stored, the data identifying activities actually performed to achieve at least one outcome;

category recording means to enter and store a category designation associated with each said activity in accordance with a predefined set of activity categories;

computer program means to develop a second set of activities to achieve the at least one outcome based on the first activity set and the recorded categories; and computer-generated links between activities of the first set and activities of the second set whereby an audit of the second activity set is carried out which identifies differences between the first and second set of activities.

Preferably, the computer system records current activity data, which is appropriately categorised, and either derives a second activity set or receives data defining such a second activity set, or at least part thereof, whereby the change process may be developed.

In a particular embodiment, data is collected "vertically" within natural work teams that identify and categorise the activities of the first set. The data is grouped into a "horizontal" process view that connects the activities to provide cross-functional outcomes. A changed process can then be derived from this first activity set that is linked to the existing process but aims to optimise that process by focusing on an analysis based on activity categorisation. Thus, those activities which do not contribute to an outcome may be omitted.

The changes to the "horizontal" process can be quantified in terms of the vertical organisation structures that have accountability for those processes. Thus, not only is any change defined by the linkages between the old activities and the new, but the linkages may have vertical accountabilities and measures assigned thereto. Such mapping between the old activities and new activities defines the process changes while the linkages of the mapping to the vertical work team and organisational accountability provides a means by which change is able to be driven to implementation and measured.

BRIEF DESCRIPTION OF THE DRAWINGS

Examples of the invention will be described below with reference to the accompanying drawings in which:

FIG. 2 is a chart detailing a set of activities including a designated category for each of the activities.

DETAILED DESCRIPTION OF A PREFERRED EMBODIMENT

Figure 1:
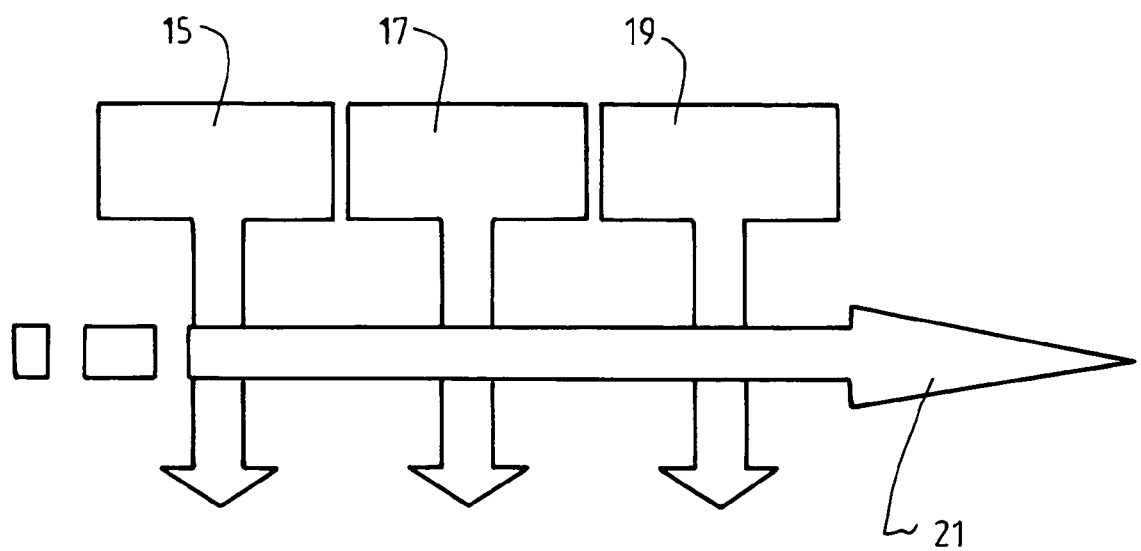
FIG. 1 is a diagrammatic illustration of data collection and process definition to achieve a business outcome.

Business processes may be broken down to a number of discrete process steps or activities. Such process steps or activities are generally distributed cross-functionally within an organisation or across multiple organisations so that, to achieve a designated outcome, activities need to be performed across a number of structural identities. FIG. 1 diagrammatically illustrates the cross-functional activities associated with data collected from several, separate work teams. The work teams may be, for example, a customer service department 15, a manufacturing department 17 and an accounts department 19. Individuals in each of these work teams will document actual activities performed to achieve a particular outcome. Using the documented activities, a process definition 21 is able to be developed to achieve a desired business outcome which integrates the cross-functional activity sets of the work teams. Thus, data associated with activities performed to achieve a particular business outcome is collected by the individual work teams 15, 17 and 19. The information from the individual work teams is aggregated with contributions of other work teams into a process definition 21 that describes in entirety how the business outcome is achieved by the organisation. Of course, FIG. 1 illustrates a single example of data collected across a series of work teams 15, 17 and 19. In practice, the data collected will be analysed and aggregated along a multiplicity of "horizontal" cross-functional activity sets to achieve multiple outcomes.

The collected data is categorised to identify the nature of individual activities, and the data is grouped into the "horizontal" process view that shows how the activities connect together to perform the cross-functional outcome. Categorisation enables process changes to be developed obviating those activities that do not contribute to the outcome. A changed process can then be derived that is linked to the existing process but aims to optimise it by focusing on analysis based on activity categorisation. Changes to the "horizontal" process can be quantified in terms of the organisational structure for each of the work teams that are accountable for the activities. This ensures that not only is any change defined by the linkage between the old activities and the new, but the linkages have vertical accountabilities assigned thereto. The effects of change are thus able to be managed and measured across the organisation.

With reference to FIG. 2, the chart illustrates a record of staff and/or management identified and recorded activities performed by staff in order to achieve a desired business outcome, in this case, the processing of a loan application. In the example of FIG. 2, the identified activities are listed in column 10. Each of the activities are designated with an activity number listed in column 12.

In the simplified example, the individual activities performed by staff in achieving the desired outcome of processing the loan application have been listed in the usual order of performance. However, it will be understood that the order is not necessarily relevant in deciding the manner of recording of the activities. What is important is the category into which each individual activity is classified. The activities have been designated with an activity category which are identified in column 14. In this example, "C" represents a core activity, "S" represents a support activity, "D" represents a discretionary activity and "N" represents an activity designated as being noise. The term "noise" is intended to refer to an activity which, of it self, does not contribute to the desired outcome and which may detract or deflect the staff from the successful achievement of the desired outcome. As indicated previously, "noise" activities may often be activities that have been established as a result of deficiencies in the business process, and this may be shown clearly in this example, where the "noise" activities can be seen to result from ineffective process steps or training. In the example of FIG. 2, the activities 1.2, 1.5, 1.7, 1.9 and 1.10 have each been designated as an activity of type "noise" and as such they directly detract from the successful achievement of the desired outcome. Column 28 identifies the possible cause of each of the "noise" activities.

The chart also identifies that the work group responsible for the performance of the activities comprises five employees, and the time devoted to each activity by each employee is identified in columns 16, 18, 20, 22 and 24. The total time devoted by all five employees for each activity is identified in column 26.

The total time devoted by each of the five employees across all of the activities is provided in row 30 along with a total for the time spent on all activities by all employees. This information comprises cost and resource information against which a second set of activities can be assessed.

Figure 3:
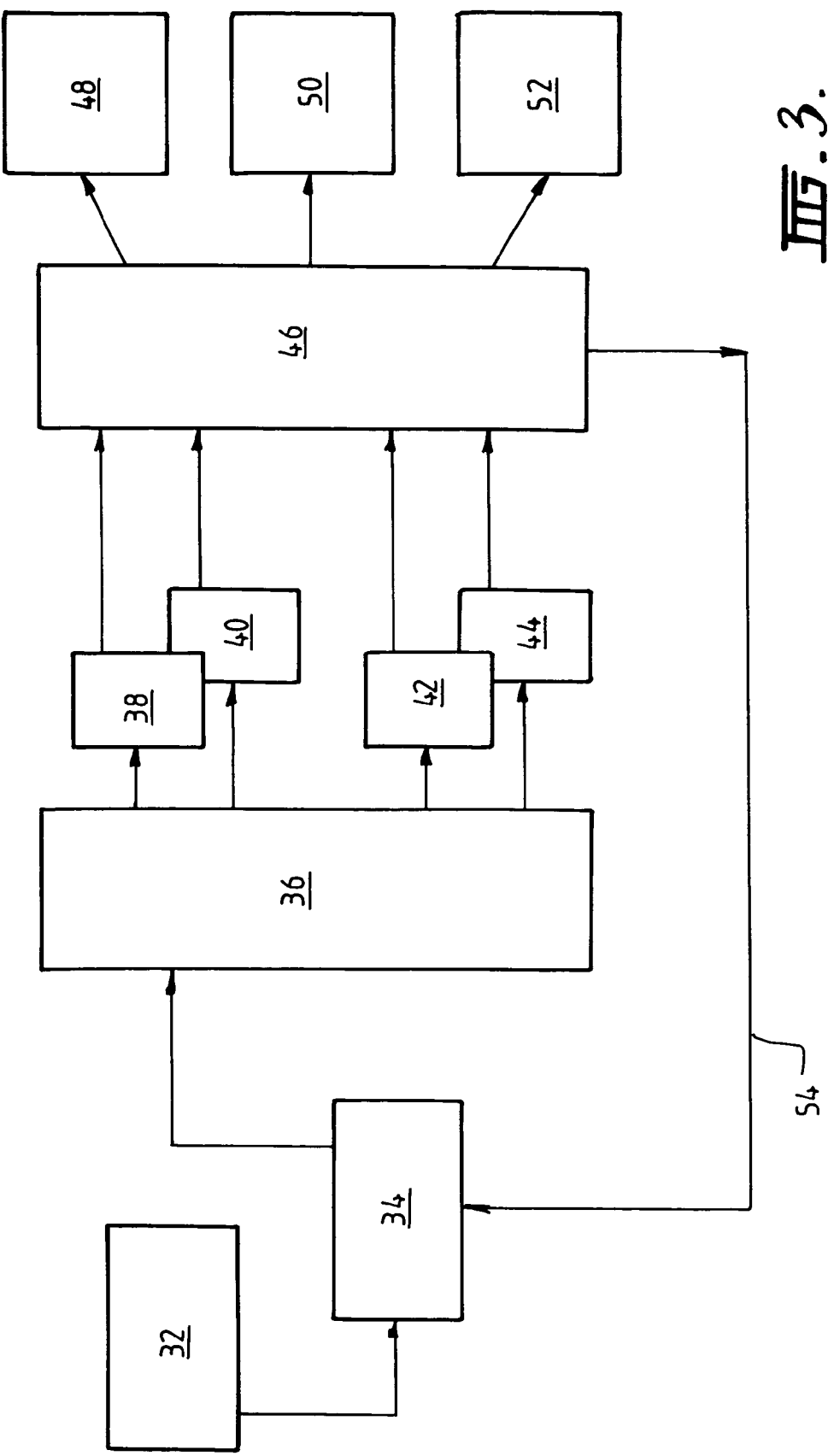
FIG. 3 is a diagrammatic representation of the steps of embodiment of the invention.

With reference to FIG. 3, a diagrammatic representation of the method steps of a preferred embodiment of the invention is provided. The method is commenced by performing an activity analysis, recording and categorisation of a first set of activities, as identified at block 32, representing the current activities performed to achieve a desired outcome, such as shown in FIG. 2. Having performed the activity analysis and categorisation 32 a categorised activity list 34 is formed containing information similar to that shown in columns 10, 14, 16, 18, 20, 22, 24 and 26 of the chart of FIG. 2. It will be understood that any other information relevant to the activities may be included in the analysis. The categorised activity list is provided as an input to the production of a process report of existing activities 36. The process report 36 documents the actual activities performed within the process of definition 21 in FIG. 1.

Once a processed report of existing activities 36 has been formed identifying inter-relationships between the various activities identified in the categorised activity list 34, a "change process" may be derived to identify a second set of activities, or proposed activities, intended to achieve the same desired outcome but preferably with a more efficient use of resources. This may be derived with the assistance of computer software, and is documented as a process report of proposed activities 46. The implementation methodology of the "change process" may be performed in accordance with various techniques, such as idea quantification or planning resources, for example, idea "cards", such as those represented in FIG. 3 as items 38, 40, 42 and 44. The idea cards 38, 40, 42, 44 provide activity ideas that may be used or adopted or refined to replace, supplement, modify or qualify an original activity of the first set. In this instance, the implementation methodology for the change process incorporates the links between individual activities from the process report of existing activities 36 to the individual activities of the process report of the proposed activities 46. In this embodiment, the links between the individual existing activities and the proposed activities may include the additional information provided by the idea cards 38, 40, 42 and 44. Thus, the activities listed in the process report of proposed activities 46 are linked to similar activities in the process report of existing activities 36 through the idea cards 38, 40, 42 and 44 or directly to the idea cards if no other link exists.

All the processes, analysis, categorisation, activity set development, linking and data manipulation is carried out using computer means programmed to ensure that core activities for achieving the business outcome are maintained across the activity sets and organisational structure by auditing the established linkages. It will be appreciated that a computer system implementing embodiments of the invention will have the information embodying an idea quantification or planning resources or categorisations contained in one or more databases to which further resource material and derived activity steps may be added through manual input and programmed implementation of the processes of the invention.

Having a process report of existing activities 36, a process report of proposed activities 46 and links existing therebetween incorporating the idea cards 38, 40, 42 and 44, it is a relatively quick and simple task for a programmed computer to identify the differences between the process report of the existing activities 36 and the process report of the proposed activities 46. In particular, it is relatively easy to identify differences in resources, cost and time between the two sets of activities in order to achieve the desired business outcome. Further, making use of the links between the existing and proposed activities it is possible for a computerised system having stored information in relation to the existing activities and operating procedures therefor, to modify those operating procedures according to the details contained on an idea card and to generate a new set of operating procedures 48 for the proposed activities 46. Similarly, making use of the same links and idea cards, it is also possible for a computerised system to relatively quickly generate a competency report 50 detailing the competencies required for the proposed activities 46 and identifying differences as compared with the existing activities. Additionally, on the basis of the links and idea cards 38, 40, 42, 44 it is also possible for a computing system to quickly generate a training report 52 detailing the training and material required if a transition from the existing activities 36 to the proposed activities 46 is implemented.

The method provides for relatively quick iterations or "what if" analysis wherein a change to the idea cards and links may be proposed and the effects of that proposal in the form of procedures, competencies and training and material may be assessed. Additionally, once a proposed set of activities is finally agreed for implementation as part of the change process, the proposed activities may be resubmitted as an input to the entire process 54 in order that continual process improvement may be achieved.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method implemented in a computer system of deriving a change process in relation to actions performed to achieve a desired result, to produce a change proposal to the actions performed and yield a new procedure of achieving the desired result, the computer implemented method comprising:

in relation to a first set of activities identified and recorded as actually performed by each individual involved in order to achieve at least one outcome, a computer program of the computer system designating a category for each activity of the first set of activities according to a predefined set of activity categories, the computer program of the computer system designating activities into one of four predefined sets of activity categories consisting of "Core," "Support," "Discretionary," and "Noise";

the computer program of the computer system using the category designations to determine those activities that detract from achievement of the desired outcome;

the computer program of the computer system developing a second set of activities to achieve the desired outcome, wherein an activity designated as being a "Core" activity is essential to the achievement of the desired outcome; and the computer program of the computer system forming links between activities in the first set and activities in the second set and identifying and analyzing differences between the activities of the first and second activity sets to measure the extent to which said activities that detract from achievement of the desired outcome are resolveable by the second set of activities and to derive a change process comprising actions which are to be performed by said individuals to achieve the at least one outcome.

2. A method implemented in a computer system of deriving a change process according to claim 1 wherein an activity designated by the computer program of the computer system as being a "Support" activity supports the achievement of the core activities.

3. A method implemented in a computer system of deriving a change process according to claim 1 wherein an activity designated by the computer program of the computer system as being a "Discretionary" activity is an activity that may or may not be performed to achieve the desired outcome.

4. A method implemented in a computer system of deriving a change process according to claim 1 wherein an activity designated by the computer program of the computer system as being a "Noise" activity is an activity that directly detracts from the achievement of the desired outcome.

5. A method implemented in a computer system of deriving a change process according to claim 1 wherein the first set of activities have been identified and recorded down to a level where they can be assigned by the computer program of the computer system to a single activity category.

6. A method implemented in a computer system of deriving a change process according to claim 1, further comprising the computer program of the computer system using the links to ensure that all essential, or "core", activities of the first set are incorporated into the second set of activities.

7. A method implemented in a computer system of deriving a change process according to claim 1, further comprising the computer program of the computer system using the second set of activities to establish prompt updating of procedures, job descriptions, training and competencies, and enabling development of measurement frameworks of such activities.

8. A method implemented in a computer system of deriving a change process according to claim 1, further comprising the computer program of the computer system arranging the identified and recorded first set of activities in a flow or sequence to define inter-relationships that exist between the activities in attempting to achieve the at least one desired outcome.

9. A method implemented in a computer system of deriving a change process according to claim 1, further comprising the computer program of the computer system arranging the second set of activities in a flow or sequence defining inter-relationships therebetween such that the activities may be performed to achieve the desired outcome.

10. A method implemented in a computer system of deriving a change process according to claim 1, further comprising the computer program of the computer system recording information, including cost, time and resources required to perform the individual activity, against each individual activity.

11. A method implemented in a computer system of deriving a change process according to claim 1, further comprising the computer program of the computer system recording against each activity an individual or department responsible for the performance of that activity.

12. A method implemented in a computer system of deriving a change process according to claim 1, further comprising the computer program of the computer system using the links between activities of the first and second sets to identify differences, such as in cost, time or resources required for the performance of various activities in either of the activity sets, thereby identifying differences between the activity sets in achieving the same desired outcome, and to enable changes to be identified that can be used to update the activities.

13. A method implemented in a computer system of deriving a change process according to claim 1, further comprising the computer program of the computer system generating job descriptions for each of the activities of the second set based on the links to the activities of the first set.

14. A method implemented in a computer system of deriving a change process according to claim 1, further comprising the computer program of the computer system redefining the second set of activities as the first set, and developing a second set of activities to achieve the desired outcome, wherein links are formed between activities in the first set and activities in the second set, and identifying and analyzing differences between the activities of the first and second sets of activities.

15. A method implemented in a computer system of deriving a change process according to claim 1, further comprising the computer program of the computer system interfacing the second set of activities with idea quantification or planning resources from which activities for the second set of activities may be derived, and through which the links to the first set of activities may pass.

\* \* \* \* \*